US006920939B2

(12) United States Patent
Sasaoka et al.

(10) Patent No.: US 6,920,939 B2
(45) Date of Patent: Jul. 26, 2005

(54) WALK-BEHIND ELECTRIC CULTIVATING MACHINE

(75) Inventors: Masayuki Sasaoka, Wako (JP); Yasumi Fukuzumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/787,730

(22) Filed: Feb. 26, 2004

(65) Prior Publication Data

US 2004/0194983 A1 Oct. 7, 2004

(30) Foreign Application Priority Data

Mar. 17, 2003 (JP) ........................................ 2003-072314

(51) Int. Cl.$^7$ .............................................. A01B 33/02
(52) U.S. Cl. ........................................ 172/119; 172/42
(58) Field of Search .......................... 172/13–18, 41–43, 172/118, 119; 56/12.7

(56) References Cited

U.S. PATENT DOCUMENTS

| | | | | |
|---|---|---|---|---|
| 3,126,968 A | * | 3/1964 | Booth ........................ | 172/16 |
| 4,293,041 A | * | 10/1981 | Holmstadt et al. ............ | 172/39 |
| 5,594,990 A | * | 1/1997 | Brant et al. ................. | 30/122 |
| 6,000,836 A | * | 12/1999 | Nemazi et al. ............... | 366/64 |
| 6,052,976 A | * | 4/2000 | Cellini et al. ................ | 56/17.4 |
| 6,189,627 B1 | * | 2/2001 | Marshall et al. .............. | 172/41 |
| 6,293,349 B1 | * | 9/2001 | Marshall et al. .............. | 172/15 |
| 6,301,866 B1 | * | 10/2001 | Marshall et al. .............. | 56/233 |
| 6,340,061 B2 | * | 1/2002 | Marshall et al. .............. | 172/41 |
| 6,345,489 B1 | * | 2/2002 | Everts et al. ................ | 56/12.7 |
| 6,382,325 B1 | * | 5/2002 | Bovi .......................... | 172/41 |
| 6,439,088 B1 | * | 8/2002 | Eytchison et al. ............. | 83/13 |
| 6,516,598 B1 | * | 2/2003 | Notaras et al. ............... | 56/16.7 |

FOREIGN PATENT DOCUMENTS

| | | |
|---|---|---|
| JP | 6098601 | 4/1994 |
| JP | 10136702 | 5/1998 |
| JP | 3182930 | 4/2001 |

* cited by examiner

*Primary Examiner*—Thomas B. Will
*Assistant Examiner*—Alexandra Pechhold
(74) *Attorney, Agent, or Firm*—Adams & Wilks

(57) ABSTRACT

A walk-behind electric cultivating machine has a body frame, an electric motor mounted on the body frame and having a motor shaft, and batteries mounted on the machine body frame for supplying electric power to the electric motor. Each of the batteries has a longitudinal axis disposed generally perpendicular to a longitudinal centerline of the motor shaft. A cultivating shaft is rotatably mounted to the machine body frame and has cultivating members mounted on the cultivating shaft for rotation therewith. A transmission mechanism is mounted on the body frame and is connected to the motor shaft for transmitting a driving power of the electric motor to the cultivating members via the cultivating shaft.

18 Claims, 14 Drawing Sheets

WALK-BEHIND ELECTRIC CULTIVATING MACHINE

FIELD OF THE INVENTION

The present invention relates to walk-behind electric soil cultivating machines driven by electric motors.

BACKGROUND OF THE INVENTION

Ordinary walk-behind (soil) cultivating machines are also called "front-tine cultivating machines", and such front-tine cultivating machines are constructed to transmit driving power from a drive source, such as an engine, to a cultivating shaft so that the machine can travel on a field through rotation of cultivating claws provided on the cultivating shaft while cultivating the field with the rotating cultivating claws. Advanced front-tine cultivating machines have been developed which employ an electric motor as the drive source in place of the engine, so as to lessen burdens on a human operator by enhancing operability of the machine and achieve an enhanced working environment (see, for example, Japanese Patent No. 3182930 and Japanese Patent Laid-Open Publication Nos. HEI-6-98601 and HEI-10-136702).

In the cultivating machine disclosed in Japanese Patent No. 3182930, a battery, electric motor and cultivating shaft are provided on a machine body frame. Electric power is supplied from the battery to the motor so that driving power of the motor is transmitted to the cultivating shaft and desired cultivating work or tillage is performed via cultivating claws provided on the cultivating shaft. The disclosed cultivating machine is shown in FIGS. 13A–13C.

In the electric cultivating machine 300 of FIGS. 13A–13C, the cultivating shaft 302 with the cultivating claws 303 provided thereon is supported by a lower portion of the machine body frame 301, a rotation shaft of the motor 304 (motor shaft) is disposed horizontally above the machine body frame 301, and the battery 305 is provided on a rear portion of the body frame 301. The electric cultivating machine 300 also includes an operating handle 306 extending rearward from the machine body frame 310, which has a main switch 311, lamp 312 and remaining battery power meter 313 on its upper central portion, a forward rotation switch 315 adjacent to a left grip 314 and a reverse rotation switch 317 adjacent to a right grip 317. These electric components 304, 305, 311–313, 315 and 317 are connected to a wire harness (group of conductors or leads) 318. The motor 304 is rotated in the forward direction in response to operation of the forward rotation switch 315 and rotated in the reverse direction in response to operation of the reverse rotation switch 317.

Generally, in cultivating a field via the cultivating claws, there would occur so-called "dashing" where the cultivating claws jump upward due to a reaction force given from the ground in response to the cultivating force (hereinafter "cultivation reaction force"). The dashing would degrade a linear traveling capability of the cultivating machine, which would result in insufficient cultivating performance and hence poor cultivating finish. The lighter in weight the cultivating machine 300, the more noticeable would become the tendencies.

Because the electric cultivating machine 300 of FIGS. 13A–13C includes the motor 304 and battery 305 located rearwardly of the cultivating shaft 302, not only sufficient consideration has to be given to the center of gravity of the cultivating machine 300, but also the human operator has to support the weights of the motor 304 and battery 305. As a consequence, burdens on the human operator would increase.

Further, the cultivating machine disclosed in Japanese Patent Laid-Open Publication No. HEI-6-98601 includes an electric motor and a cultivating shaft, both mounted on a machine body frame, so that driving power of the motor is transmitted to the cultivating shaft to perform desired cultivating work via cultivating claws provided on the cultivating shaft.

The cultivating machine disclosed in Japanese Patent Laid-Open Publication No. HEI-10-136702 is similar to the one disclosed in the HEI-6-98601 publication.

FIGS. 14A–14C show the cultivating machine 400 disclosed in the HEI-10-136702 publication, which includes a cultivating shaft 402 supported on a lower portion of a machine body frame 401, cultivating claws 403 provided on the cultivating shaft 402 and an electric motor (not shown) mounted on an upper portion of the machine body frame 401. The motor is covered with a cover 404. The electric cultivating machine 400 also includes an operating handle 405 extending rearward from the body frame, and a switch case 407 is mounted on a portion of the operating handle 405 adjacent to a right grip 406. Safety lock button 408 and switch lever 409 are mounted on the switch case 407. The switch lever 409 can be operated by the human operator holding the lever while depressing the safety lock button 408 with the thumb of his or her hand grasping the right grip 406. The motor can be rotated only when a micro switch 411 is kept ON via the switch lever 409. Reference numeral 412 represents a wire harness (group of conductors or leads), and 413 a left grip.

The cultivating machine 400 shown in FIGS. 14A–14C is not equipped with any battery; neither is the cultivating machine disclosed in the HEI-6-98601 publication. Therefore, the HEI-6-98601 and HEI-10-136702 publications fail to show an installed position of a battery in the cultivating machine.

SUMMARY OF THE INVENTION

In view of the foregoing prior art problems, there has been a demand for an improved walk-behind electric cultivating machine which can not only achieve enhanced cultivating performance but also reduce burdens on a human operator.

To accomplish the above-mentioned object, the present invention provides a walk-behind electric cultivating machine, which comprises: a machine body frame; an electric motor provided on an upper portion of the machine body frame; a plurality of batteries provided on an upper portion of the machine body frame for supplying electric power to the electric motor; a cultivating shaft mounted to a lower portion of the machine body frame and having a plurality of cultivating claws provided thereon; and a transmission mechanism mounted to a lower portion of the machine body frame for transmitting driving power of the electric motor to the plurality of cultivating claws via the cultivating shaft, and in which the electric motor has a motor shaft extending downward, the transmission mechanism is positioned immediately below the motor shaft and the batteries are positioned around and adjacent to the electric motor.

With the transmission mechanism positioned immediately below the motor rotation shaft extending downward and the batteries positioned around and adjacent to the motor, not only the heavy motor but also the heavy batteries can be positioned almost immediately above the cultivating claws and close to the center of gravity of the walk-behind electric cultivating machine. Thus, the electric cultivating machine equipped with the batteries can present an enhanced weight balance, thereby limiting undesired "meandering" of the cultivating machine and enhancing the linear traveling capability and operability of the machine. As a consequence, the present invention can significantly lower burdens on the human operator and yet achieve an enhanced cultivating performance.

In the present invention, the weight of the batteries acts on the cultivating claws from immediately above, so that the human operator does not have to support the weight of the batteries and the burdens on the human operator can be further reduced. In addition, the cultivating claws can bite into the earth with an increased efficiency, which thereby avoids the dashing caused by the cultivation reaction force. In addition, the inventive arrangements can increase the cultivating depth of the cultivating claws, thereby improving the cultivating performance.

Further, even where the walk-behind electric cultivating machine is relatively light in weight, there is no need to provide a heavyweight object, such as a counterweight, in front of or over the cultivating claws in order to increase weight distribution to the claws.

Furthermore, preferably, the batteries are positioned distributively adjacent to the left and right sides of the motor and/or in front of the motor, so that the weight of the batteries acts substantially uniformly on the left and right cultivating claws. Therefore, the left and right cultivating claws can bite into the earth substantially uniformly, so that left and right cultivation reaction forces acting on the cultivating machine can be made generally equal. As a consequence, it is possible to limit "rolling" of the cultivating machine about an axis, in the front-to-rear direction, passing the center of gravity of the machine, and thus the undesired "meandering" of the cultivating machine can be limited even more effectively, which thereby enhances the linear traveling capability, operability and cultivating performance of the machine. Furthermore, with some of the batteries disposed distributively in front of the electric motor, the weight of the batteries acts on front portions of the cultivating claws so that the cultivating claws can bite into the earth with an increased efficiency, which thereby avoids the dashing.

Preferably, the plurality of batteries are placed on the fender that is mounted on the machine body frame for covering upper portions of the cultivating claws, so that the fender can serve also as a battery support and thus there is no need to provide a separate battery support. Furthermore, with the relatively bulky batteries placed on the fender making efficient use of an empty space over the fender, the cultivating machine can be effectively reduced in size. Moreover, with the heavy batteries disposed at as low a position as possible, the center of gravity of the cultivating machine can be set at a lower position, which can restrict the rolling more effectively to thereby achieve an enhanced linear traveling capability of the machine.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
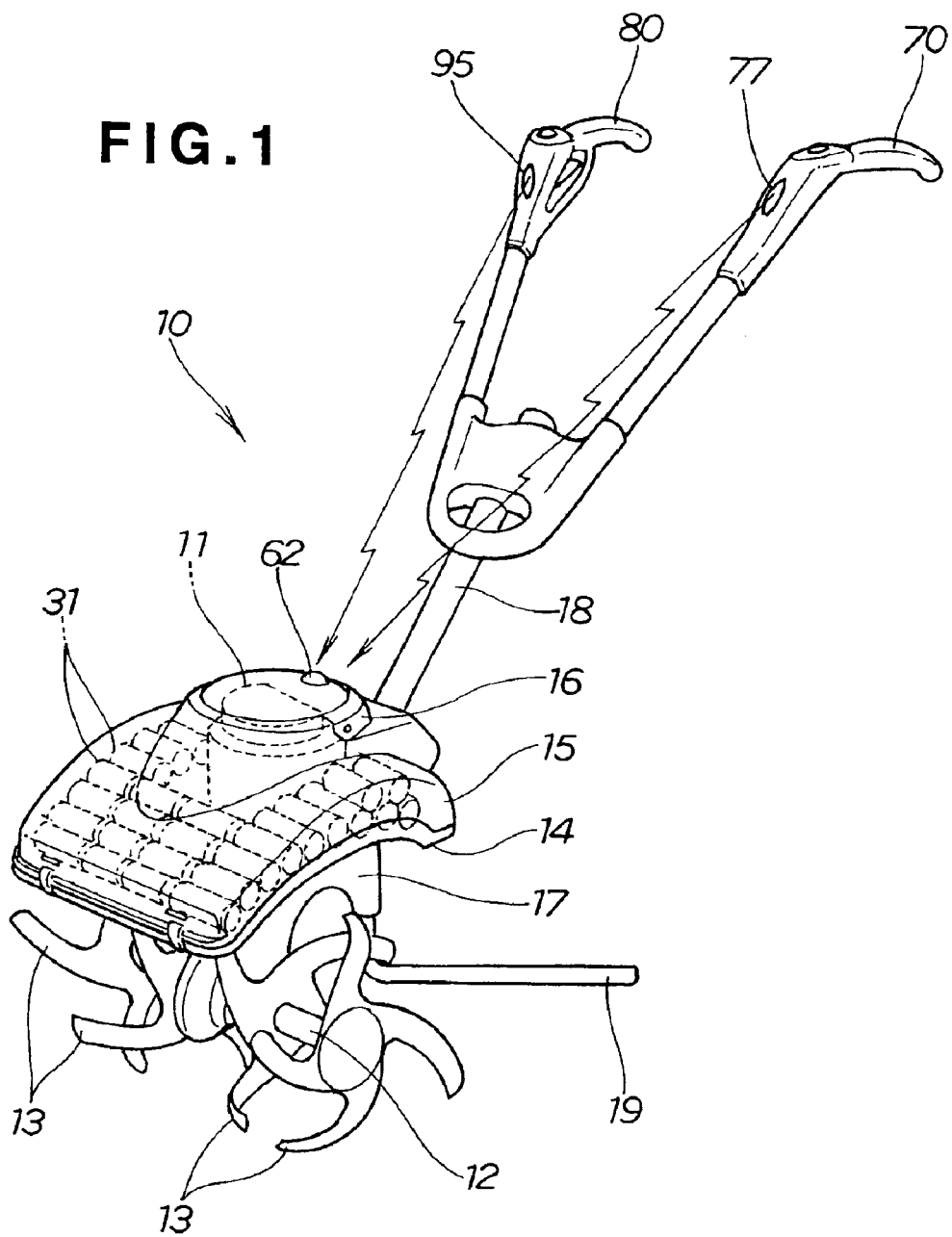
FIG. 1 is a perspective view of a walk-behind electric cultivating machine in accordance with an embodiment of the present invention.

Reference is now made to FIGS. 1–7 showing a walk-behind electric cultivating machine according to an embodiment of the present invention.

The walk-behind electric cultivating machine 10 is a self-propelled, front-tine cultivating machine, which is constructed to transmit driving power from an electric motor 11 (i.e., drive source of the machine 10) to a cultivating shaft 12 so that the machine can travel on a field through rotation of a plurality of cultivating members in the form of cultivating claws 13 provided at left and right end portions of the cultivating shaft 12 while cultivating the field with the rotating cultivating claws 13. The cultivating claws 13 are covered with an upper fender 14, and an upper cover 15 covers an upper surface of the fender 14. The upper fender 14 and upper cover 15 define first and second cover members. respectively, forming an enclosure having an interior space Sp for housing the electric motor 11 and batteries 31 for supplying electric power to the electric motor 11. The cultivating shaft 12 is a rotation shaft extending horizontally between opposed inner side surfaces of a machine body frame 17 (i.e., in a widthwise direction of the body frame 17), and the fender 14 is a cover designed primarily to prevent scattering of earth and sand.

The electric cultivating machine 10 has a very small size so that the human operator can carry the machine by grasping with his or her single hand a carrying handle 16 provided on the top of the upper cover 15. The cultivating machine 10 includes an operating handle section 18 extending rearwardly and upwardly from a rear portion of the machine body frame 17, and a resisting bar 19 extending downwardly from a rear lower portion of the machine body frame 17.

Figure 2:
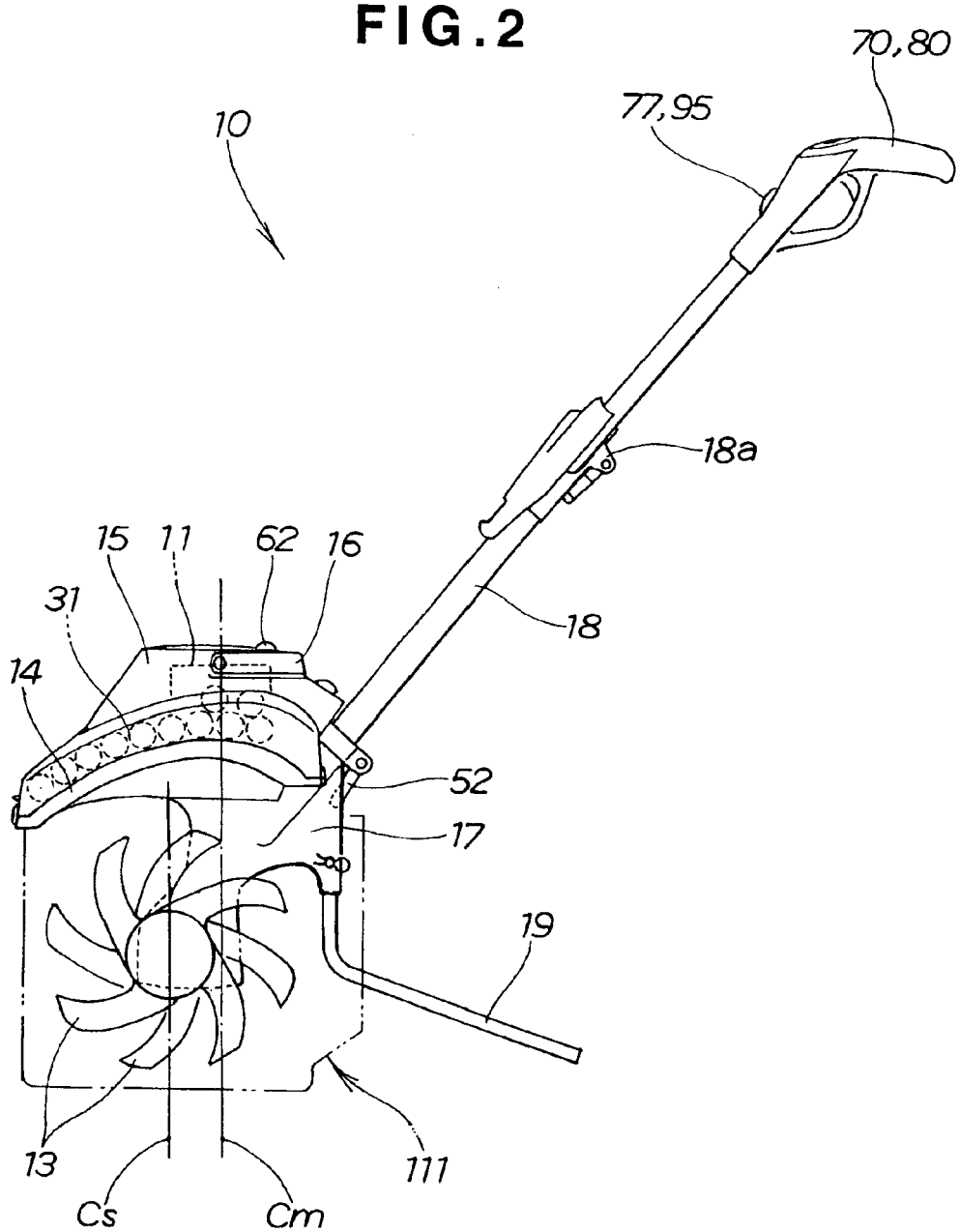
FIG. 2 is a left side view of the electric cultivating machine of the invention shown in FIG. 1.

The operating handle section 18 includes a slide mechanism 18a provided midway along its length, as seen from FIG. 2. When in an unlocked position, the slide mechanism 18a allows an upper half portion of the handle section 18 to slide vertically along the length so that left and right grip members 70 and 80 can be set at an appropriate height corresponding to a height and preference of the human operator.

Desired work can be performed by the human operator manipulating the operating handle section 18 while walking behind the machine 10.

The resisting bar 19 can be inserted in the earth not only to set a desired cultivating depth of the cultivating claws 13, but also to produce a resisting force against a traction force by the cultivating claws 13.

The cultivating shaft 12 and cultivating claws 13 can be cleaned (mainly, washed), by putting a lower half portion of the machine body frame 17 and cultivating claws 13 in a cleaning box 111 depicted by imaginary line in FIG. 2. At that time, the fender 14 is placed and set over the top of the cleaning box 111 opening upwardly.

Figure 3:
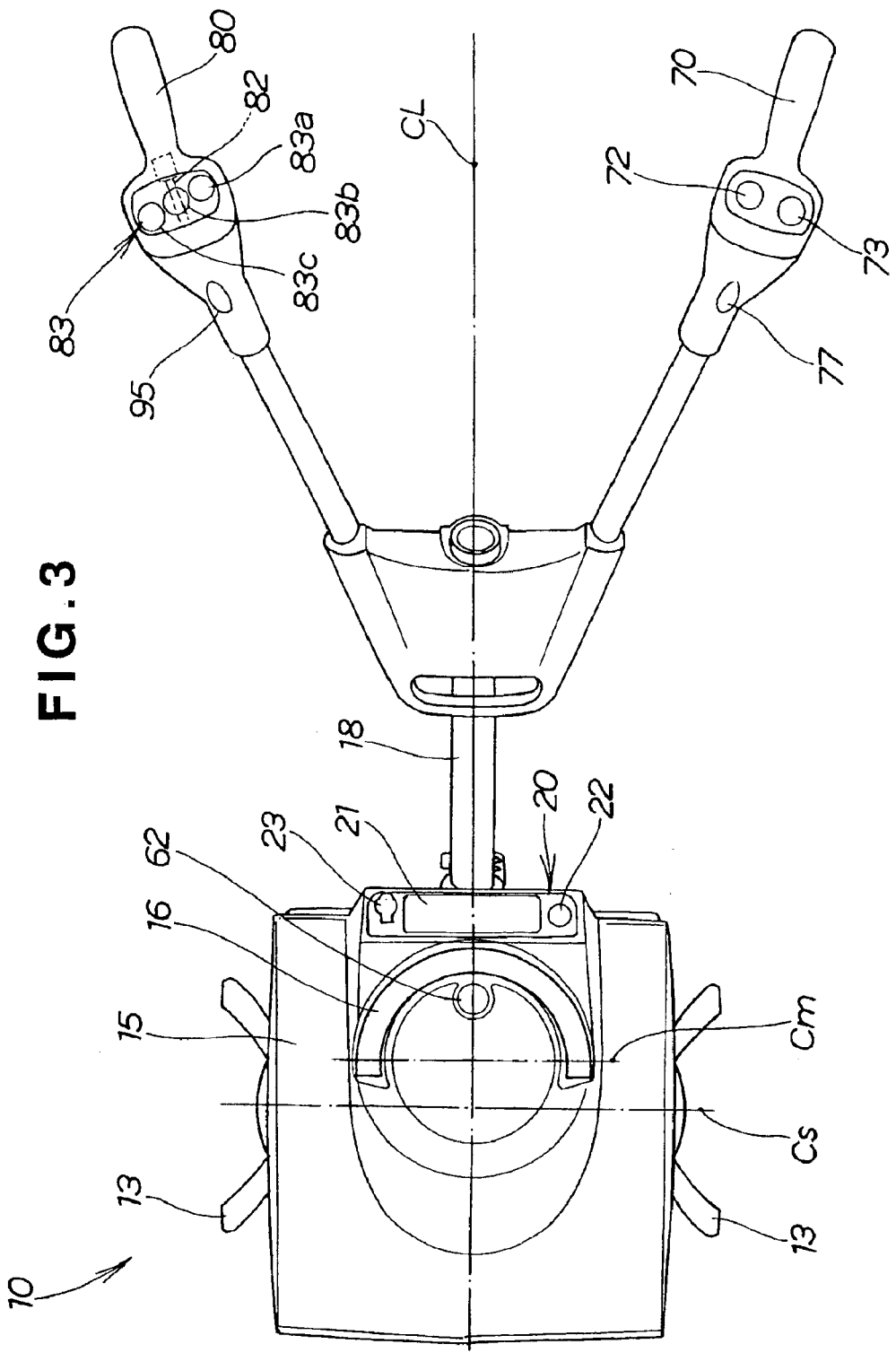
FIG. 3 is a top plan view of the electric cultivating machine of the invention.

As shown in FIG. 3, the electric cultivating machine 10 includes a control box 20 provided on a rear upper portion of the upper cover 15, and the control box 20 includes a display section 21 positioned along a longitudinal centerline CL between opposite sides of the machine body frame 17, a cleaning switch 22 disposed to the left of the display section 21, and a charging socket 23 disposed to the right of the display section 21.

The operating handle section 18 is bifurcated at its intermediate point into left and right handle portions, so that the section 18 as a whole takes a Y shape as viewed in plan. Left and right grip members 70 and 80 are attached to the respective distal ends of the left and right handle portions, and details of the grip members 70 and 80 will be discussed later.

Figure 4:
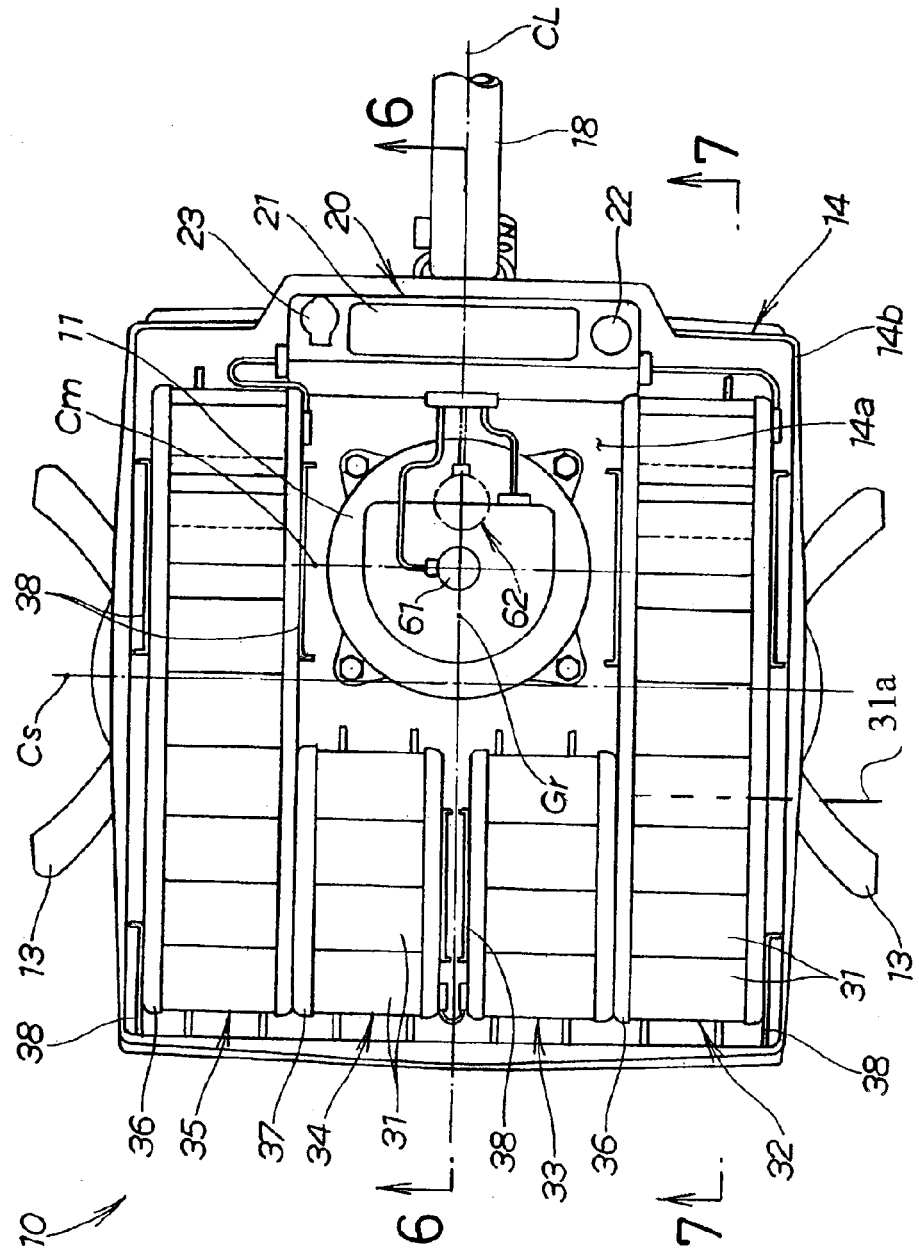
FIG. 4 is a top plan view of the electric cultivating machine of FIG. 3 with an upper cover removed.

As illustrated in FIG. 4, the electric motor 11 is disposed on the longitudinal centerline CL, and a plurality of rows of the batteries 31 are positioned distributively adjacent to the peripheral surface of the motor 11. Specifically, the batteries 31 are arranged symmetrically about the longitudinal centerline CL of the machine body frame 17 over a practically entire surface of the fender 14 having a rectangular shape as viewed in plan.

More specifically, in the illustrated example, four rows of the batteries 31 are arranged in the widthwise (left-and-right) direction of the machine body frame 17, and the four rows consist of the first (or left outer) row 32, second (or left inner) row 33 located in front of the motor 11, third (or right inner) row 34 located in front of the motor 11 and fourth (or right outer) row 35. Namely, 34 located in front of the motor 11 and fourth (or right outer) row 35. Namely, the plurality of batteries 31 is positioned to the left and right and in front of the motor 11; in other words, the batteries 31 are positioned around and adjacent to the motor 11.

Figure 5:
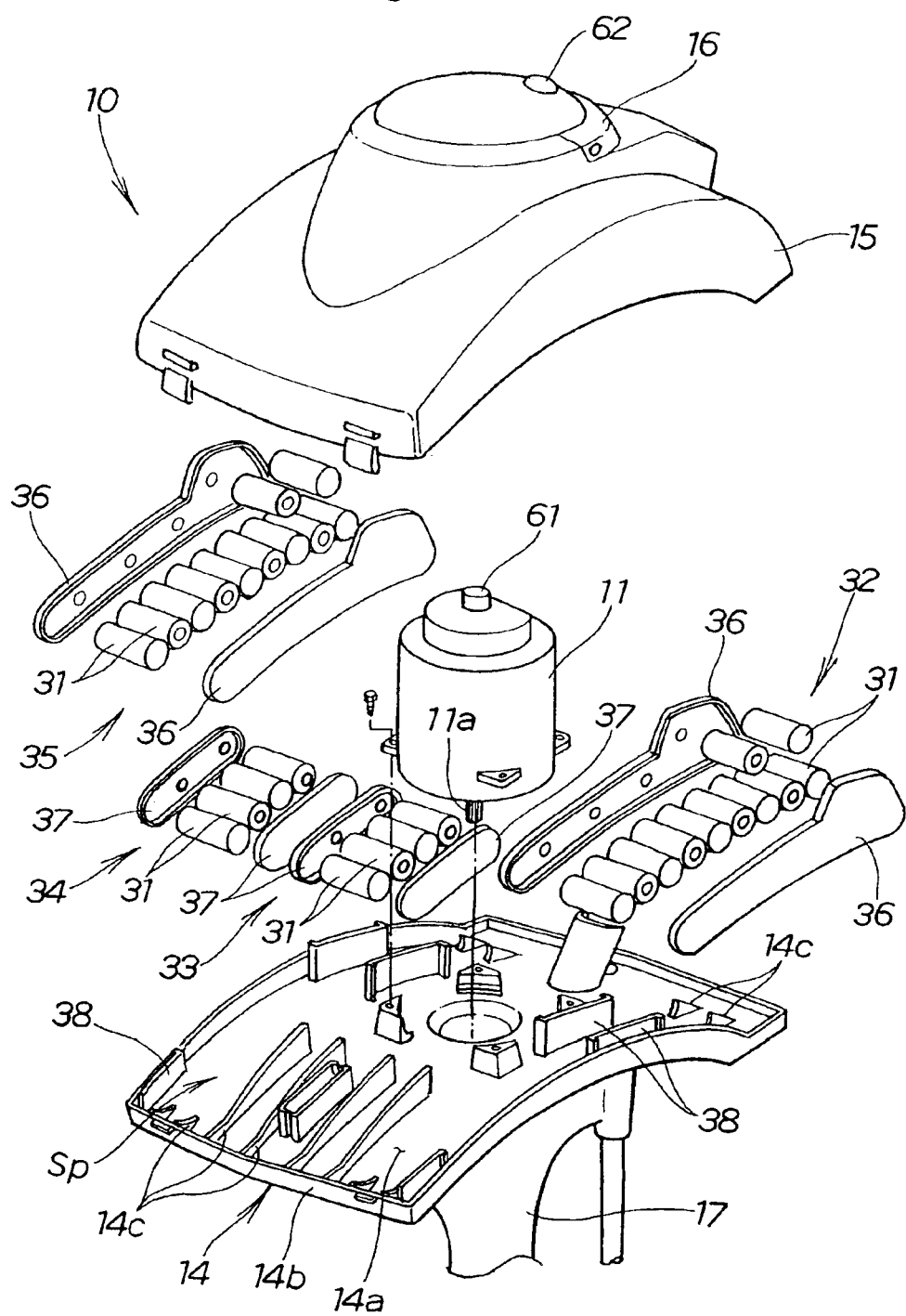
FIG. 5 is an exploded perspective view of a fender, upper cover, electric motor and battery constituting the electric cultivating machine of FIG. 1.

As clearly seen in FIG. 5, the batteries 31 are each oriented in the widthwise (left-and-right) direction of the machine body frame 17, and each of the rows 32–35 is held between longer battery holder members 36 or between shorter battery holder members 37 and placed on the fender 14. The batteries 31 are supported by the holder members 36, 37 so that a longitudinal axis 31a of each of the batteries 31 is disposed generally perpendicular to a centerline cm of the motor 11 (see also FIGS. 4, 6).

Specifically, the fender 14 is a rectangular member provided integrally on an upper end portion of the machine body frame 17. The fender 14 is generally in the form of a rectangular tray having a generally flat bottom portion 14a and a peripheral edge portion 14b protruding from four edges of the bottom portion 14a. The bottom portion 14a has a plurality of support members in the form of supporting ridges 14c for supporting therebetween the batteries 31. The upper cover 15 is removably attached to the fender 14. The motor 11 and batteries 31 are accommodated in the space Sp defined between the fender 14 and the upper cover 15. The motor 11 is bolted to an upper portion of the machine body frame 17, i.e. upper surface portion of the fender 14.

This way, the motor 11 and batteries 31 are mounted on the upper portion of the machine body frame 17, and the battery holder members 36 and 37 are positioned via resilient supporting pieces 38.

Figure 6:
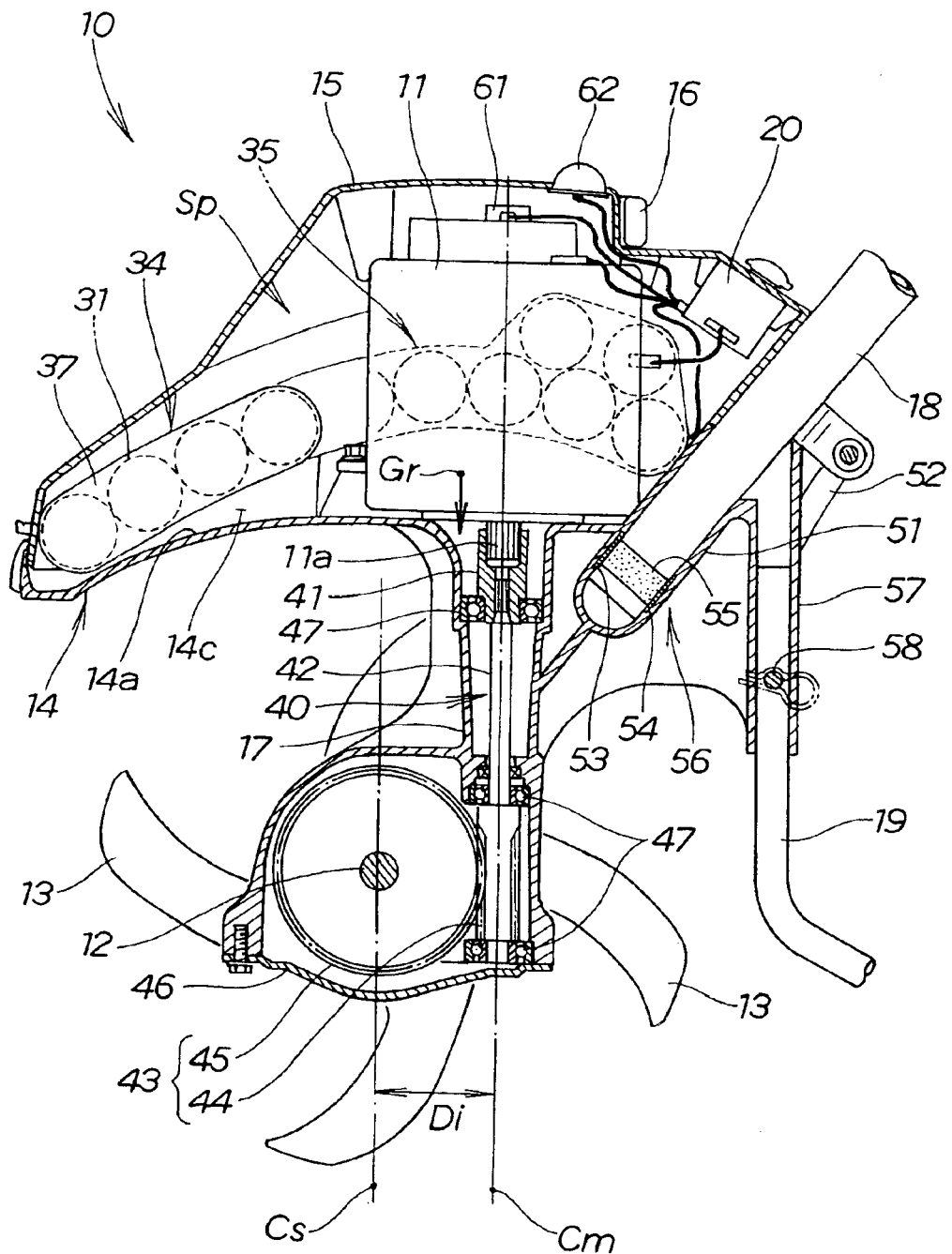
FIG. 6 is a sectional view taken along the 6—6 line of FIG. 4.

As illustrated in FIG. 6, the cultivating shaft 12, cultivating claws 13 and transmission mechanism 40 are disposed in a lower portion of the machine body frame 17. Power from the motor 11 is transmitted via the transmission mechanism 40 and cultivating shaft 12 to the claws 13. The transmission mechanism 40 is positioned immediately below a downwardly-extending rotation shaft 11a of the motor 11 (i.e., motor shaft 11a).

The transmission mechanism 40 includes a substantially-vertical transmission shaft 42 positioned coaxially with the motor shaft 11a connected thereto via a coupling 41, and a worm gear mechanism 43 for transmitting power from a lower portion of the transmission shaft 42 to the horizontal cultivating shaft 12. The worm gear mechanism 43 includes a worm gear 44 provided on the transmission shaft 42, and a worm wheel 45 spline-coupled to the cultivating shaft 12.

The transmission shaft 42 and the worm gear mechanism 43, together constituting the transmission mechanism 40 are collectively accommodated within the machine body frame 17 functioning as a transmission case. Reference numeral 46 represents a lid, and 47 a bearing.

As also seen in FIG. 6, the centerline Cm of the motor 11, i.e. the centerline Cm of the motor shaft 11a, is spaced rearwardly from the centerline Cs of the cultivating shaft 12 by a distance Di. The distance Di is determined in accordance with sizes of the worm gear 44 and worm wheel 45.

Note that the worm gear mechanism 43 may be replaced with another type of gear mechanism, such as a bevel gear mechanism or screw gear mechanism. If the worm gear mechanism 43 may be replaced with a bevel gear mechanism, the centerline Cm of the motor shaft 11a can be set to coincide with the centerline Cs of the cultivating shaft 12.

The machine body frame 17 includes a cylindrical handle support 51 and a cylindrical resisting-bar support 57 both integrally formed therewith, and the handle support 51 extends rearwardly and upwardly from a rear upper portion of the machine body frame 17 while the resisting-bar support 57 extends downwardly from a rear upper portion of the machine body frame 17. The operating handle section 18 is secured to the machine body frame 17, by inserting it in the handle support 51 and locking it via a locking lever 52.

The handle support 51 has a pair of inner body-side terminals (fixed electrodes) 53 and 54, and the handle section 18 has a handle-side terminal (movable electrode) 55 provided on its outer peripheral surface. The fixed electrodes 53 and 54 and movable electrode 55 together constitute a handle attachment switch 56. By inserting and setting the handle section 18 in the handle support 51 from above, the fixed electrodes 53 and 54 are electrically interconnected via the movable electrode 55.

The resisting bar 19 is inserted in the resisting-bar support 57 from below and secured to the support 57 via a pin 58.

Rotation sensor 61 for detecting a rotating speed of the motor 11 is provided on the top of the motor 11. The third battery row 34 has four batteries 31 disposed side by side in the front-and-rear direction of the machine body. Receiver 62 is disposed on a rear upper portion of the upper cover 15.

Figure 7:
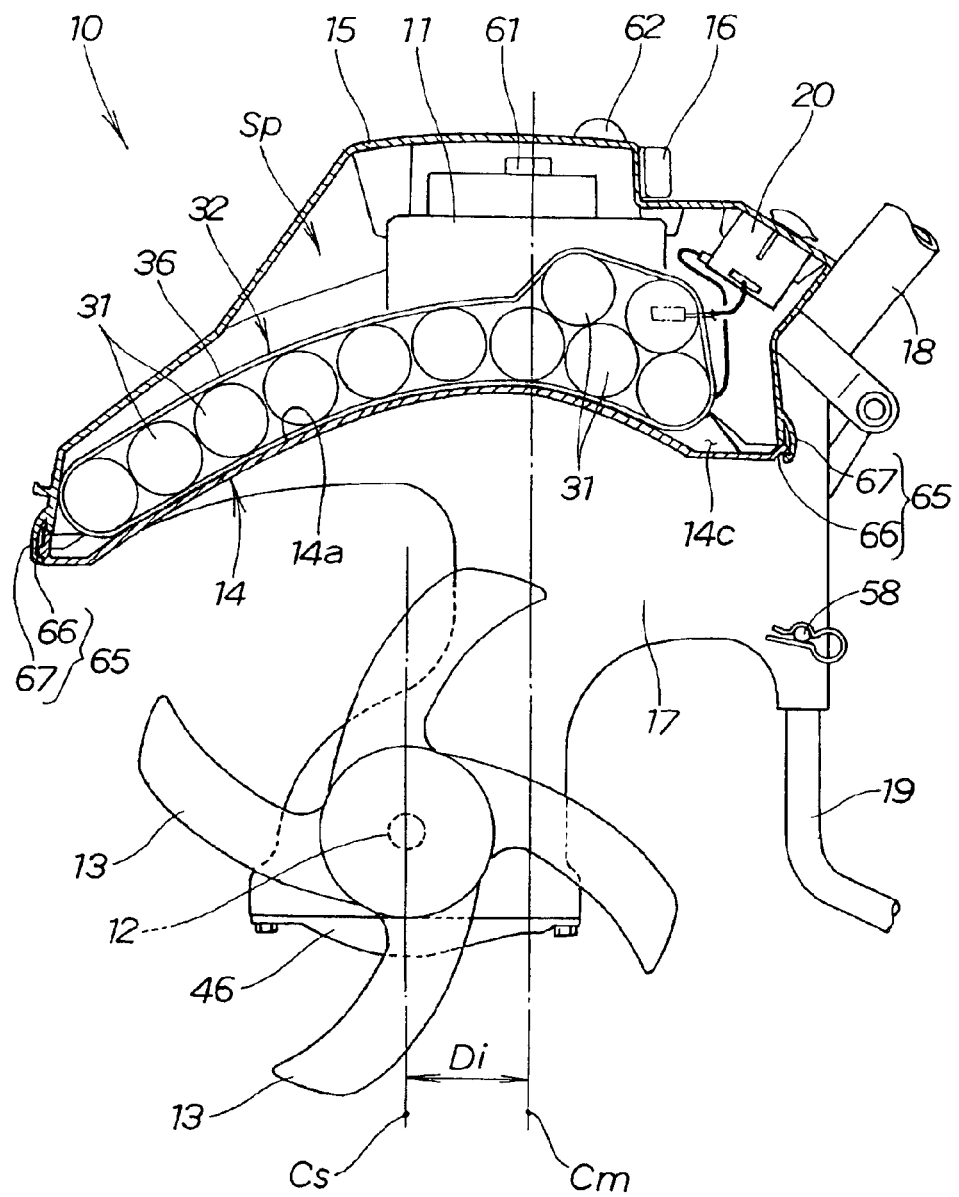
FIG. 7 is a sectional view taken along the 7—7 line of FIG. 4.

As illustrated in FIG. 7, the first battery row 31 has nine batteries 31 disposed side by side in the front-and-rear direction of the machine, and two additional batteries 31 laid on the three rear-end batteries 31. Mechanism 65 for securing the upper cover 15 to the fender 14 is of a snap-fit type which includes a locking projection 66 of the fender 14 and an engaging portion 67 of the upper cover 15 engaging with the locking projection 66.

FIGS. 8, 9A–9C and 10A–10C show the left and right grip members 70 and 80 of the operating handle section 18 employed in the cultivating machine of the invention.

Figure 8:
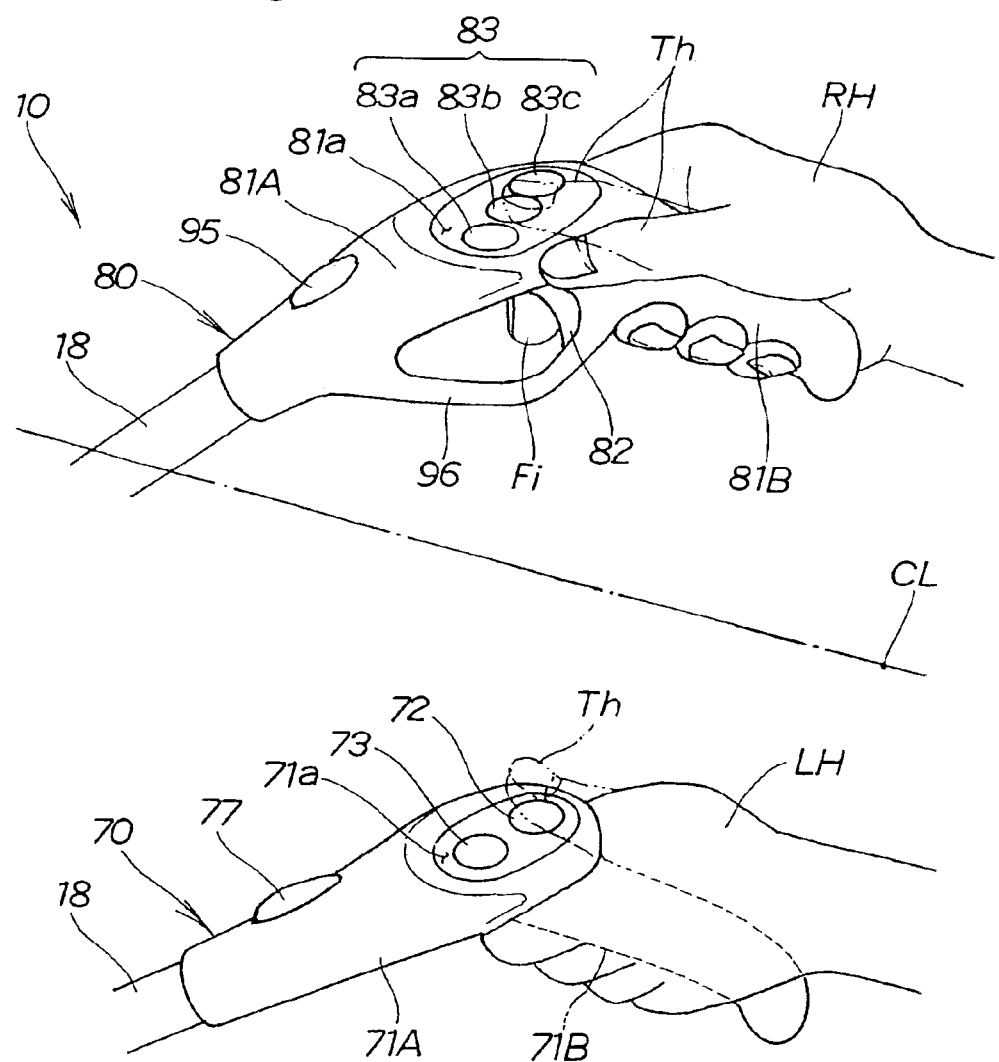
FIG. 8 is a perspective view of left and right grip members shown in FIG. 1.

As illustrated in FIG. 8, the left grip member 70 is integrally formed of resin, which includes an operating section 71A provided on a distal end portion of the left handle portion and a grip section 71B extending rearwardly from the rear end of the operating section 71A.

On the operating section 71A, there are provided a work starting operation button 72 and a main operation button 73. The work starting operation button 72 is a push button for activating and deactivating (starting and stopping rotation of) the motor 11 (FIG. 6), and the main operation button 73 is a push button for powering on and powering off the machine 10. Typically, these operation buttons 72 and 73 are operated with the thumb Th of the left hand LH grasping the grip section 71B.

The work starting operation button 72 is disposed on an upper surface portion 71*a* of the operating section 71A close to the longitudinal centerline CL of the machine body, i.e. on an inner region of the upper surface portion 71*a*. The main operation button 73 is disposed to the left of the work starting operation button 72 on the upper surface portion 71*a*, i.e. on an outer region of the upper surface portion 71*a*.

Namely, in the instant embodiment, the work starting operation button 72 having a higher frequency of use during the work is positioned on the inner region close to the longitudinal centerline CL of the machine body 17, while the main operation button 73 having a lower frequency of use during the work is positioned on the outer region close to the left end of the upper surface portion 71*a* and remote from the longitudinal centerline CL.

Because these operation buttons 72 and 73 are operated using the thumb Th of the left hand LH gripping the grip section 71B, the work starting operation button 72 positioned close to the longitudinal centerline CL of the machine body is easier to depress than the main operation button 73 positioned remote from the centerline CL. With such arrangements, operability of the work starting operation button 72 having a higher frequency of use during the work can be enhanced, so that burdens on the human operator can be reduced. Because operability of the main operation button 73 having a lower frequency of use during the work is made lower than that of the work starting operation button 72 in this way, the main operation button 73 can be prevented from being erroneously operated against intention of the human operator. Namely, in the instant embodiment, the positional arrangement of the operation buttons 72 and 73 has been chosen with ergonomic considerations taken into account.

The right grip member 80 is integrally formed of resin, which includes an operating section 81A provided on a distal end portion of the right handle portion and a grip section 81B extending rearwardly from the rear end of the operating section 81A. The right grip member 80 has a trigger-like work preparing lever 82 provided on the underside of the grip section 81B at a position where the lever 82 can be pulled with the pointing finger Fi of the right hand RH gripping the grip section 81B.

On the operating section 81A, there are provided a plurality of (e.g., three) speed changing operation buttons 83, which constitutes a speed adjusting operation section for switching the rotation speed of the motor 11 between a plurality of (e.g., three) different levels. Typically, the speed adjusting operation section 83 is operated with the thumb Th of the right hand LH gripping the grip section 81B while pulling the work preparing lever 82.

The three speed changing operation buttons 83, which are a low speed button 83*a*, medium speed button 83*b* and high speed button 83*c*, are arranged in a horizontal row from a position close to the machine body centerline CL toward the right end of the operating section 81A. If the low speed button 83*a* is depressed, the motor 11 is rotated at a low speed, if the medium speed button 83*b* is depressed, the motor 11 is rotated at a medium speed, and if the high speed button 83*c* is depressed, the motor 11 is rotated at a high speed.

Figure 9A:
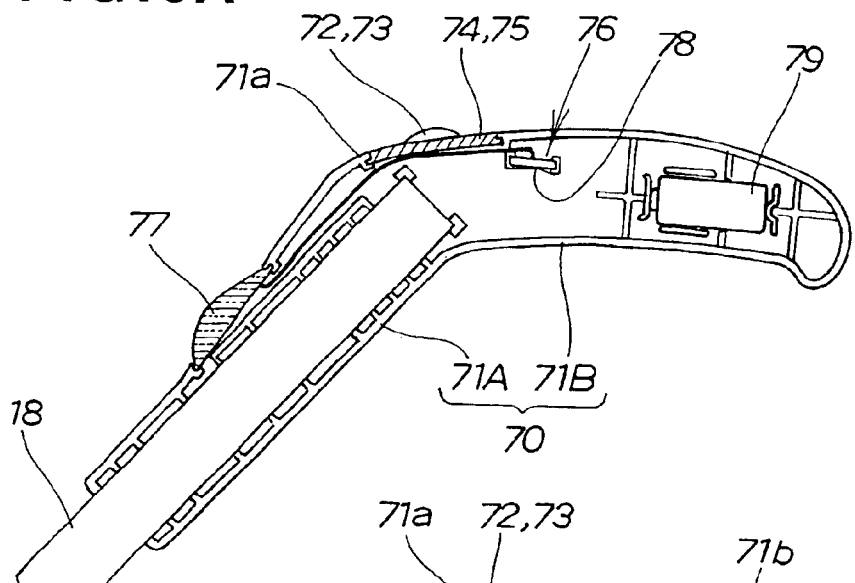
FIGS. 9A, 9B and 9C are views of the left grip member shown in FIG. 8.
Figure 9B:
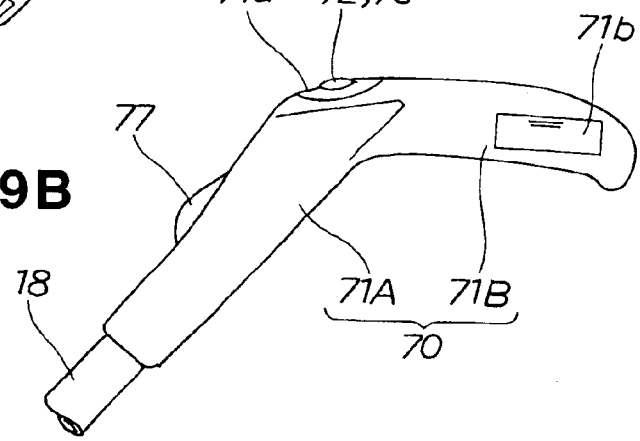
Figure 9C:
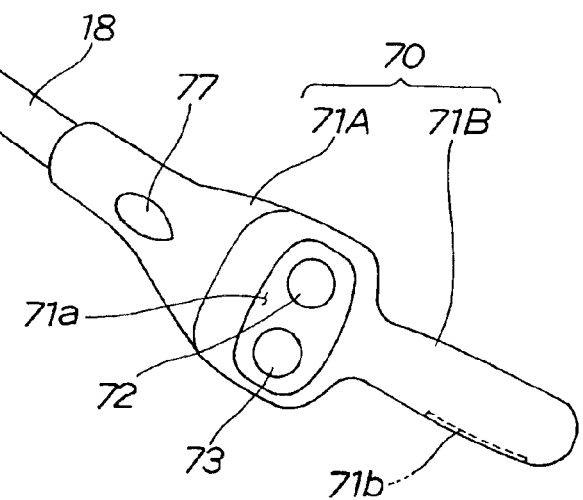

FIGS. 9A, 9B and 9C show more details of the left grip member 70 illustrated in FIG. 8.

The left grip member 70 is provided with a work starting switch (motor switch) 74 for turning on or off the motor 11 in response to operation of the work starting operation button 72, main switch 75 powering on or off the cultivating machine in response to operation of the main operation button 73, and an encoder 76 for encoding each of switch signals generated by the switches 74 and 75. These switches 74 and 75 and encoder 76 are mounted on an upper front portion of the grip section 71B. Encoded signal output from the encoder 76 is transmitted as a radio signal via a left transmitter 77 that is provided on a front portion of the operation section 71A.

The encoder 76 is mounted on a substrate 78 and powered by an encoder battery 79. The grip section 71B has a snap-fit lid 71*b* on its side surface, and the lid 71*b* can be opened and closed when the encoder battery 79 is to be replaced. Namely, by opening the lid 71*b*, the encoder battery 79 can be replaced through a not-shown opening.

Figure 10A:
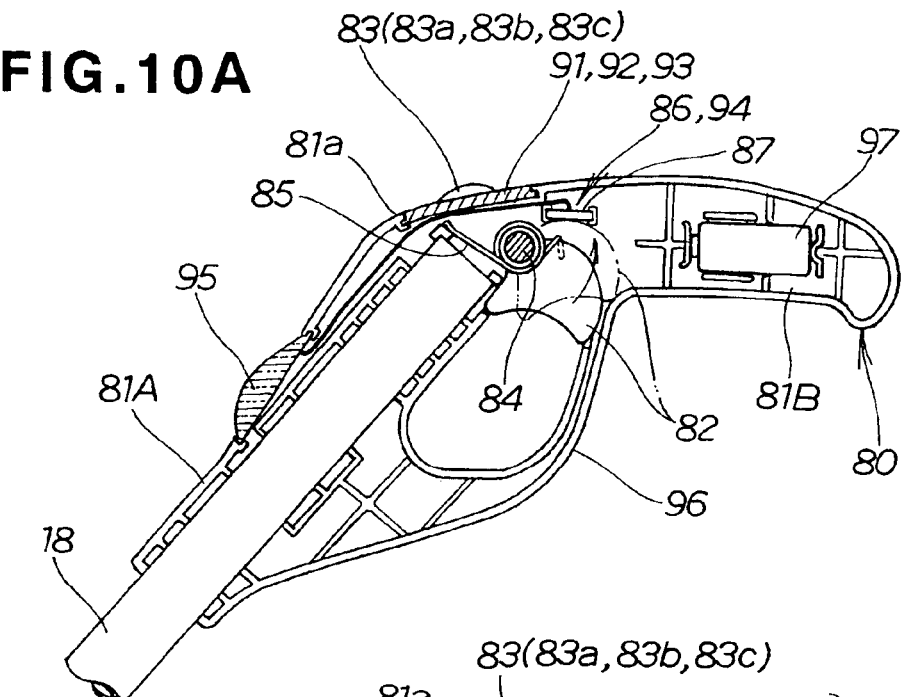
FIGS. 10A, 10B and 10C are views of the right grip member shown in FIG. 8.
Figure 10B:
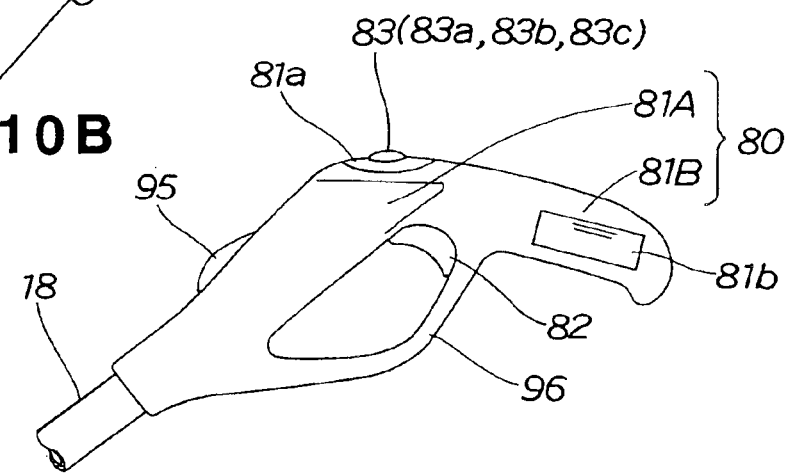
Figure 10C:
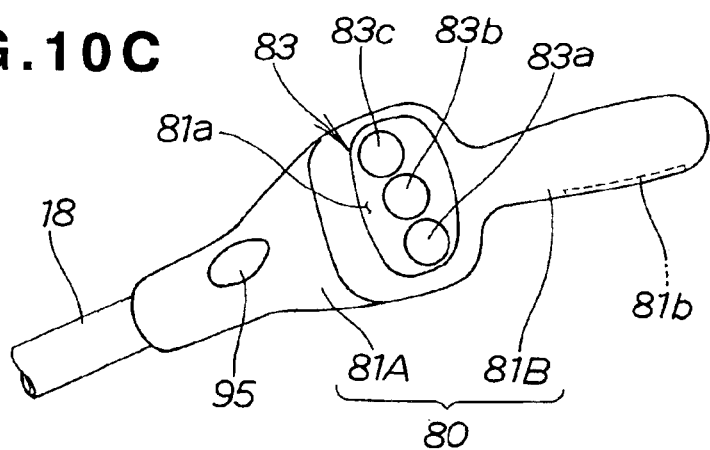

FIGS. 10A, 10B and 10C show more details of the right grip member 80 illustrated in FIG. 8.

The right grip member 80 has, in addition to the trigger-like work preparing lever 82 mounted for pivotal movement in the front-and-rear direction about a pin 84, a return spring 85 normally urging the work preparing lever 82 to an OFF position depicted by solid line in FIG. 10A, and a work preparing switch 86 turned on or off in response to operation of the work preparing lever 82.

The work preparing switch 86 is an automatically-resettable push button switch mounted on a substrate 87, which is kept ON only while the work preparing lever 82 is held, by being pivoted by the human operator, in the ON position depicted by imaginary line in FIG. 10A and is turned off once the human operator releases the work preparing lever 82. The work preparing switch 86 is a well-known trigger switch that is brought into or out of an open-contact position in response to operation of the work preparing lever 82.

The right grip member 80 has a low speed switch 91 that is turned on or off in response to operation of the low speed button 83*a*, a medium speed switch 92 that is turned on or off in response to operation of the medium speed button 83b, a high speed switch 93 that is turned on or off in response to operation of the high speed button 83c, and an encoder 94 for encoding each of signals from the switches 91–93 and work preparing switch 86. These switches 91–93 and encoder 94 are mounted on an upper front portion of the grip section 81B.

Encoded signal output from the encoder 94 is transmitted as a radio signal via a right transmitter 95 that is provided on a front portion of the operation section 81A. The encoder 94 is mounted on the substrate 87.

The low, medium and high speed switches 91–93 are each in the form a conventional automatically-resettable type push button switch, which is kept ON only while the human operator depresses the corresponding button, and turned off once the human operator releases the switch.

In the instant embodiment, the trigger-like work preparing lever 82 is mounted on a lower front portion of the grip section 81B for pivotal movement in the front-and-rear direction about the pin 84, and a lever guard 96 surrounding the preparing lever 82 is formed integrally on the right grip member 80. Therefore, it is possible to prevent the work preparing lever 82 from being pivoted against intention of the human operator, for example, by some other object or person hitting the lever 82.

The encoder 94 is powered by an encoder battery 97. The grip section 81B has a snap-fit lid 81b on its side surface, and the lid 81b can be opened and closed when the encoder battery 97 is to be replaced. Namely, by opening the lid 81b, the encoder battery 97 can be replaced through a not-shown opening.

The receiver 62 of FIG. 1 receives each of the radio signals output from the transmitters 77 and 95 of FIG. 8.

Figure 11:
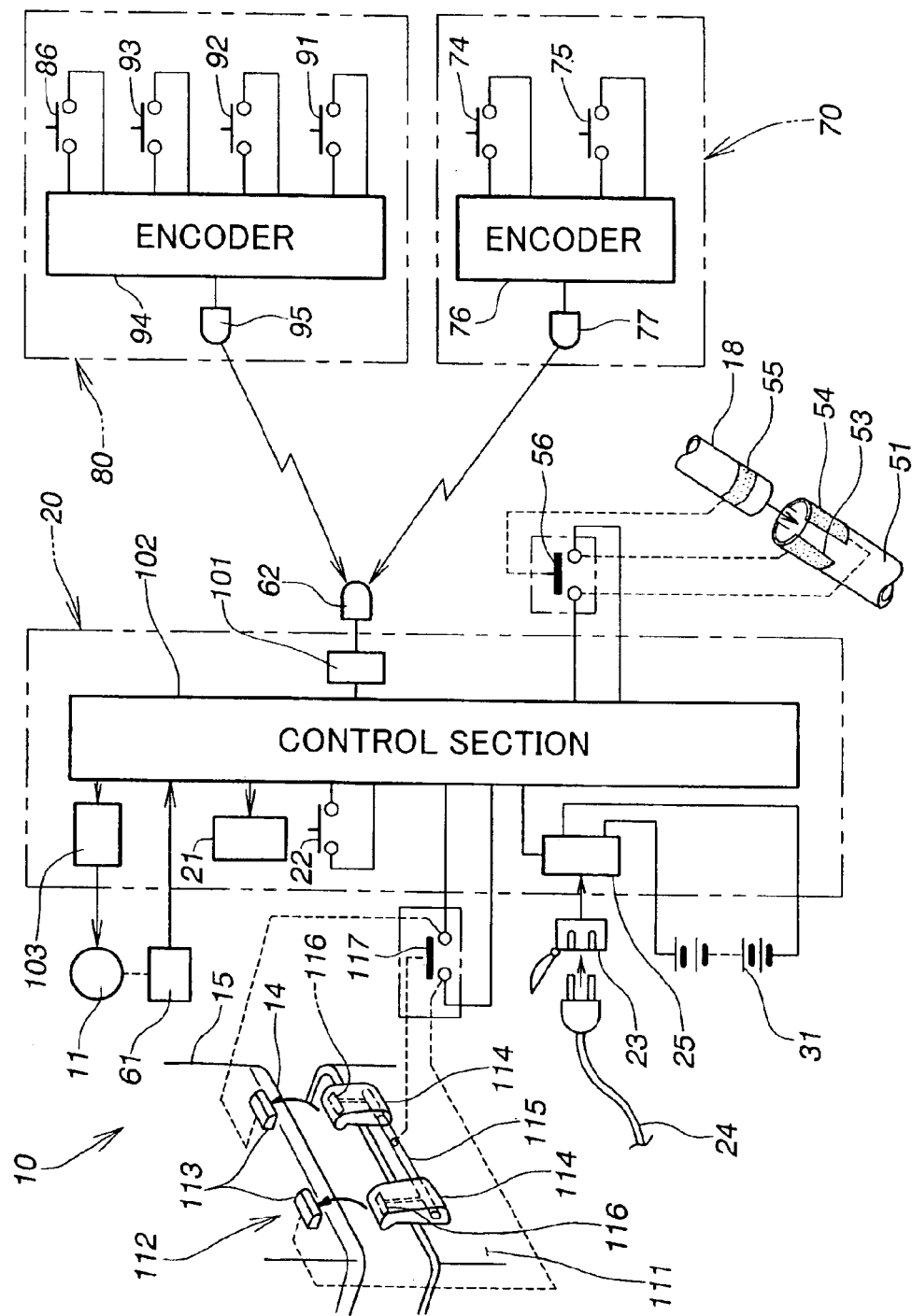
FIG. 11 is an electric block diagram of the walk-behind electric cultivating machine of the invention.

FIG. 11 is a diagram showing electric functions of the walk-behind electric cultivating machine shown in FIG. 1.

The left grip member 70 is provided with the work starting switch 74, main switch 75, encoder 76 and transmitter 77. The right grip member 80 is provided with the work preparing switch 86, low speed switch 91, medium speed switch 92, high speed switch 93, encoder 94 and transmitter 95.

The control box 20 includes a decoder 101 for decoding each radio signal received via the receiver 62, a control section 102, and a motor drive circuit 103.

Operation signal output from each of the switches of the left and right grip members 70 and 80 is encoded via the corresponding encoder 76, 94, and the resultant encoded signal is transmitted as a radio signal by the corresponding transmitter 77, 95. The radio signal from the transmitter 77, 95 is received via the receiver 62 and then decoded by the decoder 101, and the resultant decoded signal is supplied to the control section 102.

Here, the "radio signal" is a signal that can be transmitted from the transmitter 77, 95 to the receiver 62 via wireless communication; for example, the radio signal may be an infrared signal or electromagnetic wave signal. In the case where an infrared signal is used as the radio signal, the transmitters 77 and 95 may comprise light emitting elements, and the receiver 62 may comprise a light receiving element.

The control box 20 also includes the display section 21, cleaning switch 22 and charging socket 23.

The display section 21 displays operating states of the cultivating machine 10, a remaining amount of electric power and charged state of the batteries 31, a state of cleaning by the cleaning box 111, etc.

The cleaning switch 22 of the control box 20 is operable to start or stop the rotation of the motor 11 when a cleaning operation by the cleaning box 111 is to be started or stopped. Specifically, the cleaning switch 22 is in the form of a push button switch of the well-known automatically-resettable type, which is kept ON only while the human operator depresses the switch and is turned off once the human operator releases the switch.

The charging socket 23 is a connector for connection with an external charging cord 24 to charge the batteries 31 via a charger 25.

The control section 102 is supplied with a signal from any of the cleaning switch 22, battery charger 25, handle attachment switch 56, rotation sensor 61, cleaning box attachment box 117 and decoder 101, in accordance with which it controls the display section 21 and the rotation of the motor 11 via the motor drive circuit 103.

The cultivating machine 10 can be removably attached to the cleaning box 111 as follows. The fender 14 is placed on the cleaning box 111, and then attached to the box 111 via a fastening mechanism 112. The fastening mechanism 112 is of a snap-fit structure, which includes a pair of locking projections 113 provided on the fender 14 and a pair of engaging sections 114 provided via a conductive hinge pin 115 on the cleaning box 111 and engageable with the locking projections 113.

The locking projections 113 function as electrically-conductive fixed electrodes, and the engaging sections 114 have movable electrodes 116 electrically interconnected via the hinge pin 115. The locking projections (fixed electrodes) 113, movable electrodes 116 and hinge pin 115 together constitute the above-mentioned cleaning box attachment box 117. By bringing the engaging sections 114 into engagement with the locking projections 113, the locking projections 113 are electrically interconnected via the movable electrodes 116 and hinge pin 115.

Now, a description will be given about behavior of the control section 102, with reference to flow charts of FIGS. 11 and 12.

Step ST01: Necessary initialization is executed. For example, a current target rotation speed SO of the motor is set at a "low speed" Ln that is equal in value to the rotation speed set via the low speed switch 91.

Step ST02: Determination is made as to whether the operating handle section 18 has been set in the handle support 51. With an affirmative or YES determination, control proceeds to step ST03, while, with a negative or NO determination, control proceeds to step ST12. If the handle attachment switch 56 is ON, then it is determined that the operating handle section 18 has been set in the handle support 51.

Step ST03: Determination is made as to whether the main switch 75 is ON). With a YES determination, control proceeds to step ST04, while, with a NO determination, control proceeds to step ST10.

Step ST04: Determination is made as to whether the work preparing switch 86 is ON. With a YES determination, control proceeds to step ST05, while, with a NO determination, control proceeds to step ST10.

Step ST05: Determination is made as to whether the work starting switch (motor switch) 74 is ON. With a YES determination, control proceeds to step ST06, while, with a NO determination, control proceeds to step ST 10.

Step ST06: If the four conditions have been satisfied at steps ST02, ST03, ST04 and ST05 above, i.e. if affirmative determinations have been made at all of steps ST02, ST03, ST04 and ST05, the electric motor 11 is activated or caused to rotate. Namely, the electric motor 11 is caused to rotate, only upon satisfaction of the first condition that the operating handle section 18 has been set in the handle support 51, the second condition that the main operation button has been depressed (i.e., the main switch 75 has been depressed or turned on), the third condition that the work preparing lever has been shifted to a predetermined position (i.e., the work preparing switch 86 has been turned on) and the fourth condition that the work starting button has been depressed (i.e., the work starting switch 74 has been turned on).

Step ST07: The target motor rotation speed SO is read which is currently set by turning-on of the low speed switch 91, medium speed switch 92 or high speed switch 93. If the high speed switch 93 has been turned on, the motor rotation speed SO is set to the high speed Hn, if the medium speed switch 92 has been turned on, the motor rotation speed SO is set to the medium speed Mn, and if the low speed switch 91 has been turned on, the motor rotation speed SO is set to the low speed Ln. When no rotation speed is designated by any one of the switches 91–93, the motor rotation speed SO is set as default at the low speed Ln.

Step ST08: Actual rotation speed SN of the motor 11 is calculated on the basis of an actual number of rotations of the motor 11, which is measured by the rotation sensor 61.

Step ST09: Control reverts to step ST02 after controlling the motor 11 in accordance with the currently-set target motor rotation speed SO. Namely, at this step, the motor 11 is controlled such that the actual rotation speed SN equals the currently-set target motor rotation speed SO. The target motor rotation speed SO is provided as a PI (Proportional and Integral) control signal in the case of the PI control, but as a PID (Proportional, Integral and Differential) control signal in the case of the PID control. Alternatively, such a control signal may be a PWM (Pulse Width Modulation) signal.

Step ST10: The motor 11 is deactivated upon satisfaction of any one of a first condition that the main operation button has been depressed again (the main switch 75 has been turned off), a second condition that the work preparing lever has been released (i.e., the work preparing switch 86 has been turned off) and a third condition that the work starting operation button has been depressed again (i.e., the work starting switch 74 has been turned off.

Step ST11: Control reverts to step ST02 after setting the target motor rotation speed SO to the low speed Ln, namely, back to the initial setting.

Step ST12: Determination is made as to whether the cleaning box 111 has been appropriately attached to the fender 14. With a YES determination, control proceeds to step ST13, while, with a NO determination, control proceeds to step ST18. If the cleaning box attachment box 117 is in the ON state, it is determined that the cleaning box 111 has been appropriately attached to the fender 14.

Step ST13: Determination is made as to whether the cleaning switch 22 is on. With a YES determination, control proceeds to step ST14, while, with a NO determination, control proceeds to step ST18.

Step ST14: If the three conditions have been satisfied at steps ST02, ST12 and ST13, the electric motor 11 is activated or caused to rotate. Namely, the electric motor 11 is caused to rotate, only upon satisfaction of the first condition that the operating handle section 18 has been taken out of the handle support 51, the second condition that the cleaning box 111 has been appropriately attached to the fender 14 and the third condition that the cleaning switch 22 has been turned on.

Step ST15: The target motor rotation speed SO is set to a cleaning rotation speed Wn that corresponds to a given number of rotations of the motor 11 suitable for washing the cultivating claws within the cleaning box 111.

Step ST16: Actual rotation speed SN of the motor 11 is calculated, for example, by the rotation sensor 61 measuring an actual number of rotations of the motor 11.

Step ST17: Control reverts to step ST02 after controlling the motor 11 in accordance with the currently-set target motor rotation speed SO. Namely, at this step, the motor 11 is controlled such that the actual rotation speed SN equals the currently-set target motor rotation speed SO. The target motor rotation speed SO is provided as a PI (Proportional and Integral) control signal in the case of the PI control, but as a PID (Proportional, Integral and Differential) control signal in the case of the PID control. Alternatively, such a control signal may be a PWM (Pulse With Modulation) signal.

Step ST18: The motor 11 is deactivated upon satisfaction of any one of a first condition that the cleaning box 111 has been detached from the fender 14 and a second condition that the cleaning switch 22 has been turned off.

Step ST19: Control reverts to step ST02 after setting the target motor rotation speed SO to the low speed Ln, namely, back to the initial setting.

The electric cultivating machine 10 of the present invention is summed up below with reference to FIGS. 4 to 7. The present invention is characterized in that the transmission mechanism 40 is positioned immediately below the motor rotation shaft 11a extending downward and the batteries 31 are positioned around and adjacent to the motor 11. With such arrangements, not only the heavy motor 11 but also the heavy batteries 31 can be positioned almost immediately above the cultivating claws 13 and close to the center of gravity Gr of the walk-behind electric cultivating machine 10.

Namely, as illustrated in FIGS. 4 and 6, the center of gravity Gr of the electric cultivating machine 10 is located between the centerline Cm of the motor 11 and the centerline Cs of the cultivating shaft 12 and on the machine body centerline CL, so that the electric cultivating machine 10 equipped with the batteries 31 can present an enhanced weight balance, thereby limiting the undesired "meandering" of the machine and enhancing the linear traveling capability and operability of the machine. As a consequence, the present invention can significantly lower burdens on the human operator and yet achieve an enhanced cultivating performance and finish.

Further, in the present invention, the weight of the batteries 31 acts on the cultivating claws 13 from immediately above, so that the human operator does not have to support the weight of the batteries 31 and the burdens on the human operator can be further reduced. Therefore, the cultivating claws 13 can achieve an improved earth-biting capability, i.e. can bite into the earth with an increased efficiency and reliability, to thereby reliably avoid the undesired dashing due to the cultivation reaction force. In addition, the inventive arrangements can increase the cultivating depth of the cultivating claws 13, thereby improving the cultivating performance.

Further, even where the walk-behind electric cultivating machine 10 is relatively light in weight, there is no need to provide a heavyweight object, such as a counterweight, in front of or over the cultivating claws 13 in order to increase weight distribution to the claws 13.

Furthermore, because the batteries 31 are positioned distributively adjacent to both of the left and right sides of the motor 11, the weight of the batteries 31 acts substantially uniformly on the left and right cultivating claws 13. Therefore, the left and right cultivating claws 13 can bite into the earth substantially uniformly, so that left and right cultivation reaction forces acting on the cultivating machine 10 can be made generally equal. As a consequence, it is possible to limit "rolling" of the cultivating machine 10 about an axis, in the front-to-rear direction, passing the center of gravity Gr of the machine 10, and thus the undesired "meandering" of the cultivating machine 10 can be avoided more effectively, which thereby enhances the linear traveling capability and operability of the machine 10.

Furthermore, with some of the batteries 31 disposed distributively in front of the electric motor 11, the weight of the batteries 31 acts on front portions of the cultivating claws 13 so that the cultivating claws 13 can bite into the earth with an increased efficiency, which thereby suppresses the dashing even more effectively.

Because the plurality of batteries 31 are placed on the fender 14 covering upper portions of the cultivating claws 13, the fender 14 can serve also as a battery support, and thus there is no need to provide a separate battery support.

Furthermore, with the relatively bulky batteries 31 placed on the fender 14 making efficient use of an empty space over the fender 14, the cultivating machine 10 can be effectively reduced in size.

Moreover, with the heavy batteries 31 disposed at as low a position as possible, the center of gravity Gr of the cultivating machine 10 can be set at a lower position, which can suppress the rolling even more effectively to thereby achieve the linear traveling capability of the machine 10.

Figure 12:
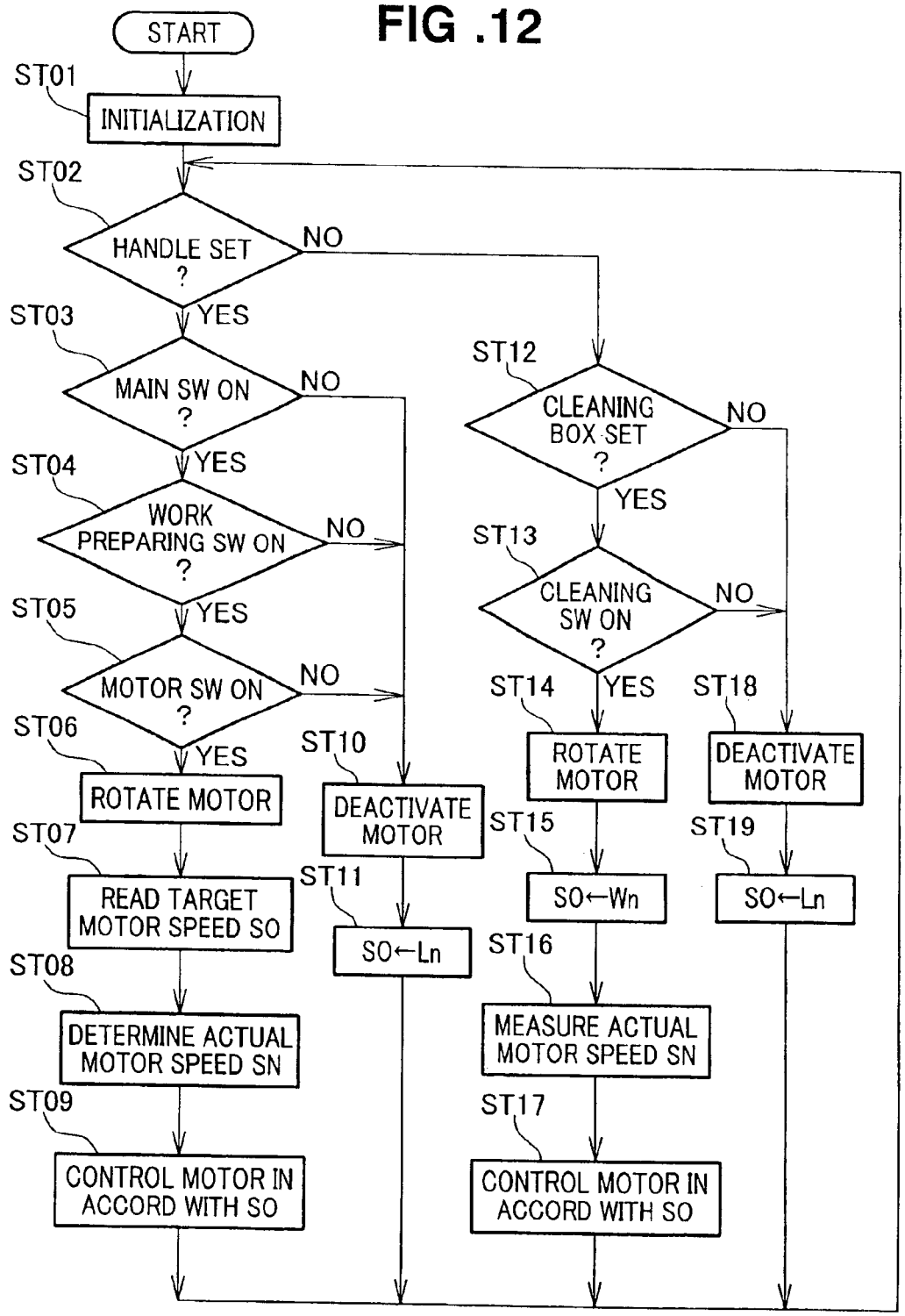
FIG. 12 is a flow chart explaining an operation of a control section of the electric cultivating machine of the invention.
Figure 13A:
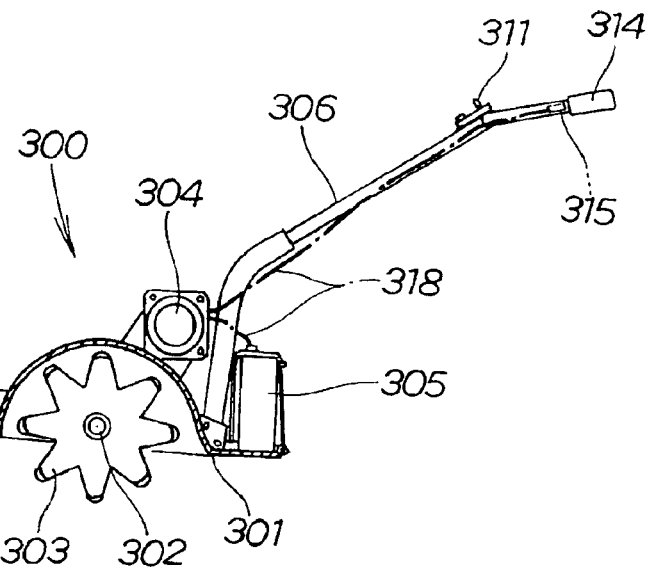
FIGS. 13A, 13B and 13C are schematic views showing a first example of conventional walk-behind electric cultivating machines.
Figure 13B:
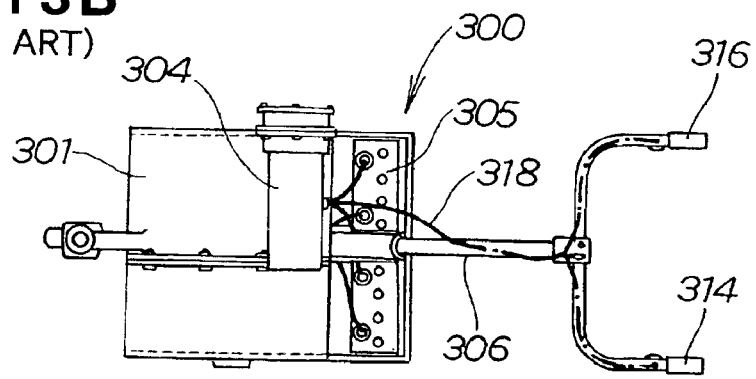
Figure 13C:
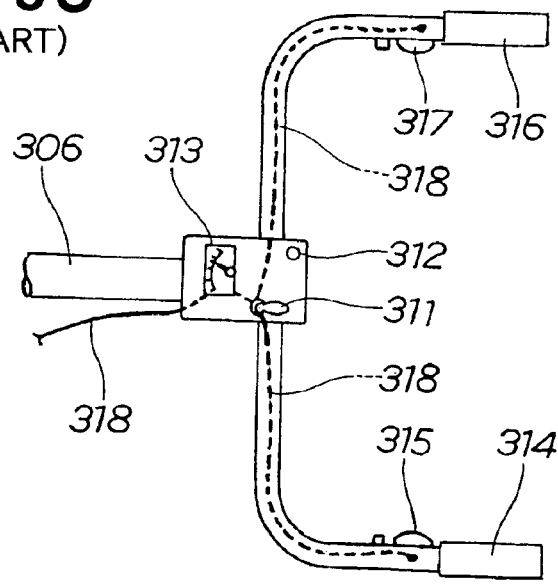
Figure 14A:
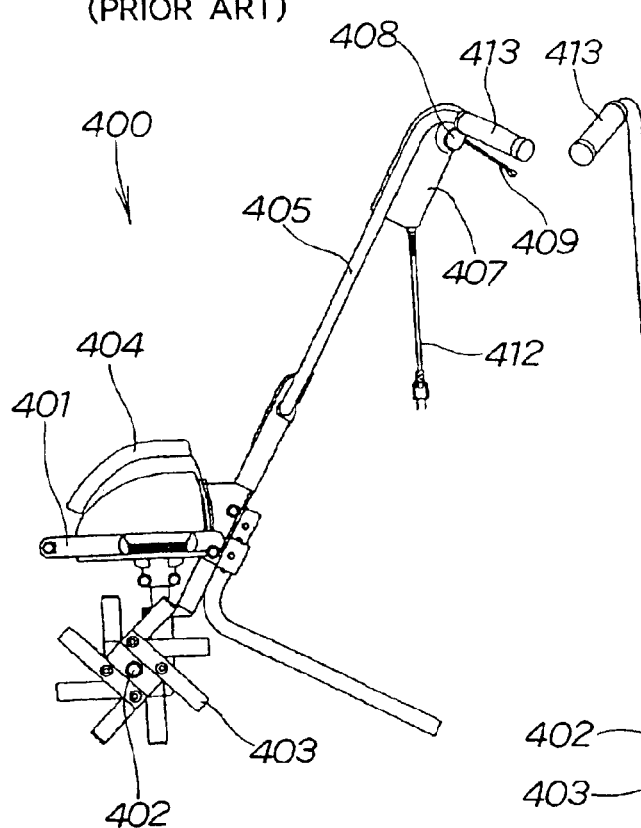
FIGS. 14A, 14B and 14C are schematic views showing a second example of the conventional walk-behind electric cultivating machines.
Figure 14B:
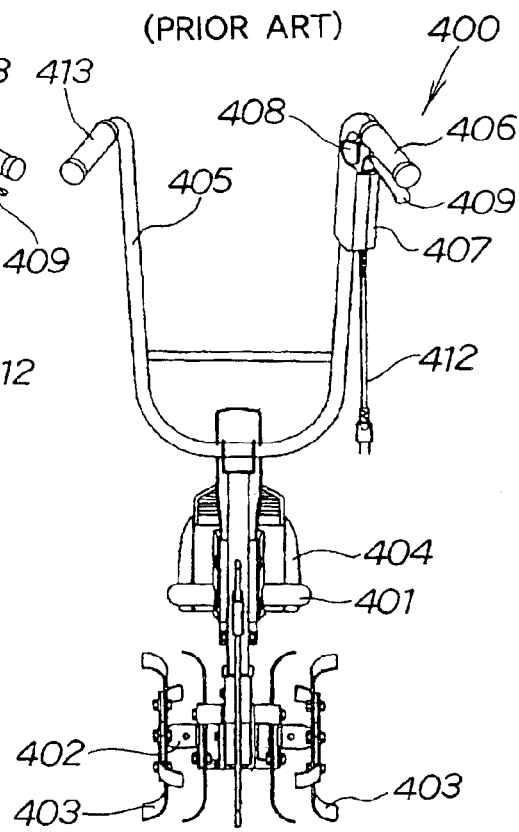
Figure 14C:
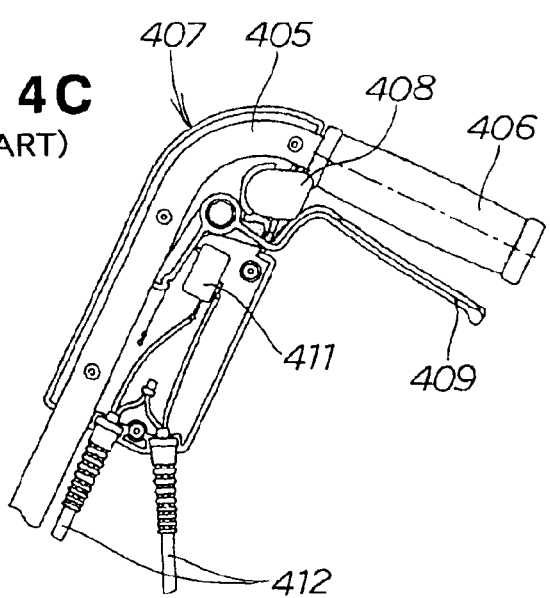

As clear from FIGS. 8, 11 and 12, the work preparing lever 82 is provided on the underside of one of the left and right grip members 70, 80, and the work starting operation button 72 is provided on a portion of the other of the left and right grip members 70, 80 close to the longitudinal centerline CL of the machine body. Also, the control section 102 controls the motor 11 to start rotating on condition that the human operator has operated not only the work preparing lever 82 but also the work starting operation button 72. Thus, in performing desired cultivating work by means of the walk-behind electric cultivating machine 10, the motor 11 can be activated by the human operator grasping the left and right grip members 70 and 80 with both hands LH and RH as illustrated in FIG. 8, operating (pulls) the work preparing lever 82 with the pointing finger Fi of one of the hands RH and operating (depresses) the work starting operation button 72 with the thumb Th of the other hand LH Because the present invention employs such a dual operation scheme requiring operation of both the work preparing lever 82 and work starting operation button 72, the motor 11 can be activated only when the human operator actually so desires.

Furthermore, because the work preparing lever 82 and work starting operation button 72 are positioned distributively on the left and right grip members 70, 80, the human operator can perform two operations, i.e. operation of the work preparing lever 82 and operation of the work starting operation button 72, using both hands LH and RH; that is, the two operations can be prevented from concentrating on only one of the hands grasping the grip members 70 and 80. Namely, the human operator does not have to perform the two operations using only one of the hands grasping the grip members 70 and 80, and these two operations are facilitated. Therefore, the dual operations for rotating the motor 11 can be performed with an increased ease, which can enhance the operability of the cultivating machine 10 and reduce burdens on the human operator.

Furthermore, because the work starting operation button 72 is provided on a portion of the left or right grip member 70 or 80 close to the machine body centerline CL, the operation button 72 can be operated with an increased ease by the thumb Th of the hand grasping that grip member.

As clear from FIGS. 1, 6, 8 and 11, the present invention is also characterized by provision of the transmitters 77 and 95 for transmitting, as radio signals, operation signals generated through operation of the operating members 72, 73, 82 and 83. As illustrated in FIG. 1, the receiver 62 for receiving the radio signals from the transmitters 77 and 95 is provided on the machine body frame (specifically, on the upper cover 15 provided on the machine body frame 17). Therefore, neither wire cable nor wire harness is necessary for connecting the operation members 72, 73, 82 and 83 and the machine body frame 17 as in the conventional machines.

As a result, there is no need to give extra considerations to handling of a wire cable and wire harness at the time of adjustment or removable of the operating handle section 18. Also, it is not necessary to take into account aging of a wire cable and wire harness, and thus the walk-behind electric cultivating machine 10 can be simplified in structure. As shown in FIG. 6, for example, the operating handle section 18 can be mounted in the handle support 51 when the cultivating machine 10 is to be used, and the handle section 18 can be freely removed from the handle support 51 when the machine 10 is to be stored in a desired space.

Because the operating handle section 18 is slidable longitudinally relative to the handle support 51, an appropriate height of the grip members 70 and 80 can be set in accordance with the height and preference of the human operator.

Whereas the preferred embodiment has been described in relation to the case where the work preparing lever 82 is in the form of a trigger, the lever 82 may be a lever held by the human operator together with, for example, the grip 80. Any desired number of the speed changing buttons may be chosen as desired.

The receiver 62 and control section 102 may be mounted directly on the machine body frame 17, rather than on the upper cover 15.

The control section 102 is typically implemented by a microcomputer operating on control programs; in an alternative, the control section 102 may be implemented by hardware circuitry to which various switches operable via the respective operating members 72, 73, 82, 83, . . . are connected.

Obviously, various minor changes and modifications of the present invention are possible in the light of the above teaching. It is therefore to be understood that within the scope of the appended claims the invention may be practiced otherwise than as specifically described.

What is claimed is:

1. A walk-behind electric cultivating machine comprising:
   a machine body frame having an upper portion and a lower portion;
   an electric motor mounted on the upper portion of the machine body frame, the electric motor having a motor shaft extending downwardly from the upper portion of the machine body frame;
   a plurality of batteries mounted on the upper portion of the machine body frame for supplying electric power to the electric motor, each of the batteries having a longitudinal axis disposed generally perpendicular to a longitudinal centerline of the motor shaft;

a cultivating shaft rotatably mounted to the lower portion of the machine body frame and having a plurality of cultivating claws mounted on the cultivating shaft for rotation therewith; and a transmission mechanism mounted on the lower portion of the machine body frame and connected to the motor shaft for transmitting a driving power of the electric motor to the cultivating claws via the cultivating shaft.

2. A walk-behind cultivating machine as claimed in claim 1; wherein the batteries are positioned distributively adjacent to left and right sides of the electric motor and/or directly in front of the electric motor but not directly behind the electric motor.

3. A walk-behind electric cultivating machine as claimed in claim 1; further comprising a fender disposed over the cultivating claws and supporting the batteries thereon.

4. A walk-behind electric cultivating machine as claimed in claim 1; wherein the batteries are arranged symmetrically about a longitudinal centerline of the machine body frame.

5. A walk-behind electric cultivating machine as claimed in claim 4; wherein the electric motor is disposed on the longitudinal centerline of the machine body frame.

6. A walk-behind electric cultivating machine comprising:
a body frame;
a first cover member integrally connected to the body frame;
a second cover member removably connected to the first cover member to define an enclosure having an interior space;
an electric motor mounted on the first cover member and disposed in the interior space of the enclosure, the electric motor having a motor shaft;
a plurality of batteries disposed in the interior space of the enclosure for supplying electric power to the electric motor the batteries being mounted on the first cover member so that a longitudinal axis of each of the batteries is disposed generally perpendicular to a longitudinal centerline of the motor shaft;
a cultivating shaft mounted on the body frame to undergo rotation;
a plurality of cultivating members mounted on the cultivating shaft for rotation therewith; and
a transmission mechanism mounted on the body frame and connected to the motor shaft for transmitting a driving power of the electric motor to the cultivating members via the cultivating shaft.

7. A walk-behind electric cultivating machine as claimed in claim 6; wherein the electric motor is disposed on a longitudinal centerline of the body frame.

8. A walk-behind electric cultivating machine as claimed in claim 6; wherein the batteries are positioned distributively adjacent to left and right sides of the electric motor and/or directly in front of the electric motor but not directly behind the electric motor.

9. A walk-behind electric cultivating machine as claimed in claim 6; wherein the batteries are disposed directly in front of the electric motor but not directly behind the electric motor.

10. A walk-behind electric cultivating machine as claimed in claim 6; wherein the batteries are arranged symmetrically about a longitudinal centerline of the body frame.

11. A walk-behind electric cultivating machine as claimed in claim 10; wherein the electric motor is disposed on the longitudinal centerline of the body frame.

12. A walk-behind electric cultivating machine as claimed in claim 6; wherein the first cover member comprises a base portion and a peripheral edge portion extending from the base portion; and further comprising a plurality of support members integral with the base portion for supporting the batteries.

13. A walk-behind electric cultivating machine as claimed in claim 12; further comprising holding members independent from the support members for holding the batteries.

14. A walk-behind electric cultivating machine comprising:
a body frame;
an operating handle section extending from the body frame for manipulation by an operator while walking behind the electric cultivating machine;
an enclosure integrally connected to the body frame and having an interior space;
an electric motor disposed in the interior space of the enclosure and having a motor shaft;
a plurality of batteries for supplying electric power to the electric motor the batteries being entirely disposed in the interior space of the enclosure so that a longitudinal axis of each of the batteries is disposed generally perpendicular to a longitudinal centerline of the motor shaft;
a cultivating shaft mounted on the body frame to undergo rotation;
a plurality of cultivating members mounted on the cultivating shaft for rotation therewith; and
a transmission mechanism mounted on the body frame and connected to the motor shaft for transmitting a driving power of the electric motor to the cultivating members via the cultivating shaft.

15. A walk-behind electric cultivating machine as claimed in claim 14; wherein the electric motor is disposed on a longitudinal centerline of the body frame.

16. A walk-behind electric cultivating machine as claimed in claim 14; wherein the batteries are positioned distributively adjacent to left and right sides of the electric motor and/or directly in front of the electric motor but not directly behind the electric motor.

17. A walk-behind electric cultivating machine as claimed in claim 14; wherein the batteries are disposed directly in front of the electric motor but not directly behind the electric motor.

18. A walk-behind electric cultivating machine as claimed in claim 14; wherein the batteries are arranged symmetrically about a longitudinal centerline of the body frame.

* * * * *